Nov. 25, 1930.  E. G. BRONSON ET AL  1,782,678
METHOD AND APPARATUS FOR DISPENSING LIQUIDS
Filed Dec. 24, 1927
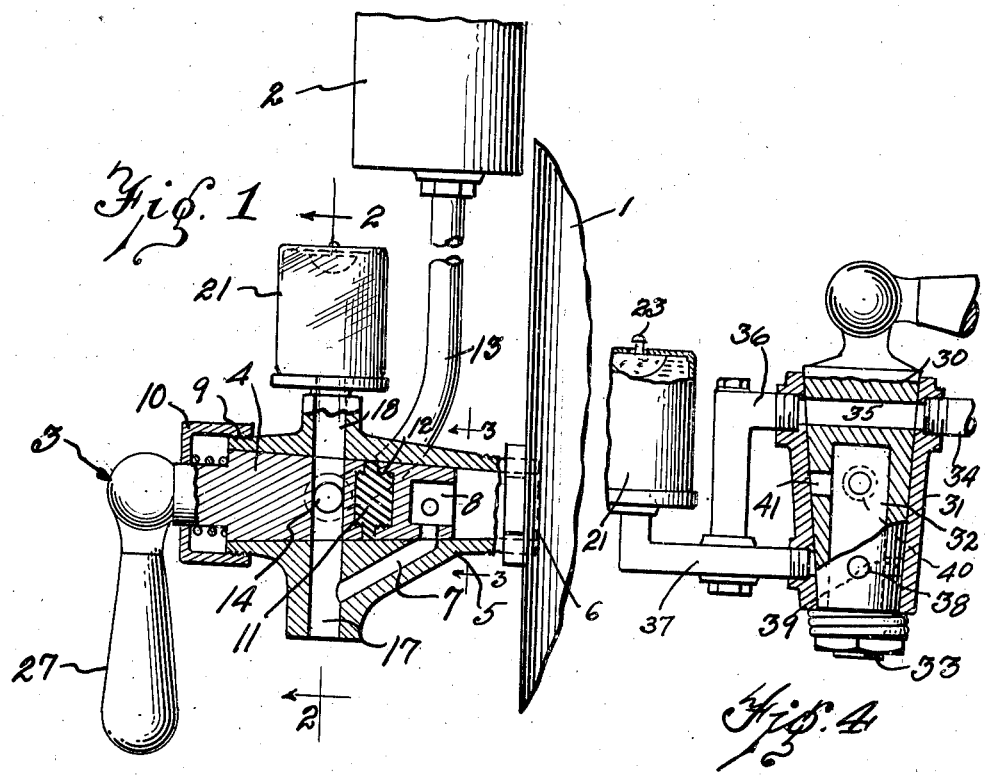
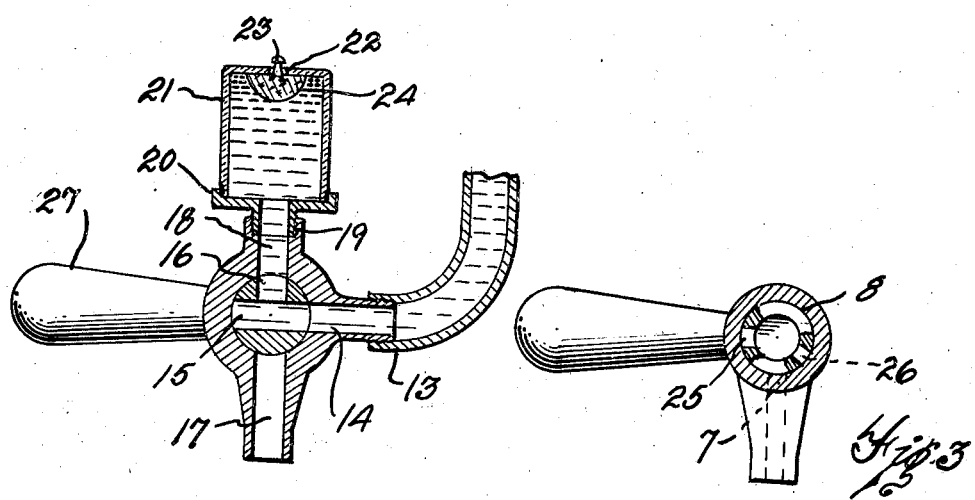
INVENTORS.
Ek Gilbert Bronson
Joseph W. Russell
BY
ATTORNEY.

Patented Nov. 25, 1930

1,782,678

UNITED STATES PATENT OFFICE

EK GILBERT BRONSON, OF DETROIT MICHIGAN, AND JOSEPH W. RUSSELL, OF EAST ORANGE, NEW JERSEY, ASSIGNORS TO AUTOMATIC COFFEE CREAMER INCORPORATION, OF DETROIT, MICHIGAN, A CORPORATION OF MICHIGAN

METHOD AND APPARATUS FOR DISPENSING LIQUIDS

Application filed December 24, 1927. Serial No. 242,384.

This invention relates to method and apparatus for dispensing liquids, and has to do particularly with a novel, compact and single faucet or valve structure for dispensing a plurality of different liquids, and accurately measuring and dispensing one liquid independently of the others. It is especially adapted to the dispensing of coffee and cream, but it may also be used for efficiently dispensing other liquids such as syrup and water or carbonated liquid.

Heretofore in dispensing coffee and cream the valves have been designed to simultaneously dispense the coffee and cream, the proportions of each usually being determined by the sizes of the respective orifices. Such devices have proven fairly satisfactory where only a relatively small amount of coffee was dispensed over a period of time, as a small variation in proportions has been immaterial, but where a large amount of coffee is dispensed and a proportionate mixture of the cream and coffee is desired to be maintained constantly, such devices have proven unsatisfactory where the level of either the coffee or cream in their respective containers has varied. Furthermore, where a bank of coffee dispensing containers are used it has been necessary to use a separate cream container for each coffee container in order to approximately keep the level of the cream the same as the coffee. In the use of dispensing devices for simultaneously dispensing syrups and water attempts have been made to segregate a specific quantity of syrup at each operation of the dispensing device, but such devices have not proved satisfactory because of their complicated structure and due to the method utilized in segregating each limited supply of syrup.

It is the object of the present invention to provide a method for visibly segregating and measuring a predetermined quantity of liquid such as cream or syrup and to control the measuring and dispensing of said predetermined quantity independently of the source of supply or manner and time of dispensing the other liquid or liquids. This novel manner of dispensing liquids is preferably carried out by means of a very simple, compact and inexpensive valve structure, comprising a single valve plug having separate coffee and cream chambers spaced longitudinally of the plug, the coffee chamber preferably being continuously in contact with the source of supply and the cream chamber being adapted to be alternately connected with the source of supply and with a visible measuring container. The valve housing is so arranged as to combine the different liquids in a common stream before being dispensed and the valve plug is so designed as to insulate the coffee chamber from the cream receiving chamber where it is desired to dispense coffee and cream.

The measuring or segregating apparatus contains several novel features in that it is visible and readily detachable whereby any size measuring container can be utilized according to the amount of syrup or coffee desired to be dispensed with a single turn of the valve, and the visible container is provided with a very light float and valve structure whereby the same quantity of syrup or cream will be segregated at each turn of the valve and whereby the syrup or cream will be rapidly dispensed at the turn of the valve.

In the drawings:

Fig. 1 is a side elevation partly in section of our novel unitary valve structure as preferably embodied in connection with the dispensing of coffee and cream.

Fig. 2 is a sectional view taken on line 2—2 of Fig. 1 and illustrating the preferred manner of arranging the ports of the rotary valve for controlling the flow of liquid to and from the visible measuring container.

Fig. 3 is a section taken on line 3—3 of Fig. 1 and illustrating the arrangement of ports in the hollow valve member for dispensing coffee with the cream or for dispensing black coffee.

Fig. 4 is a view similar to Fig. 1 but illustrating a modified form of my device wherein the valve plug is positioned vertically.

In illustrating our invention we have shown the same as being especially designed for use with the dispensing of coffee and cream, but it will be readily apparent and understood that the structure may be equally well adapted for the measuring and dispensing of syrup and water or carbonated liquids.

In Fig. 1 the coffee urn is diagrammatically illustrated and may be designated 1, and the cream container designated 2. Such coffee urn and cream container or other liquid containers may be conveniently designed and positioned as required for the particular liquids to be dispensed and the place of dispensing.

The valve structure is preferably unitary and may be generally designated 3, and comprises a tapered valve plug 4 rotatably positioned within a valve housing 5. In case of the valve being positioned horizontally as shown in Fig. 1, the inner end of the valve housing 5 is preferably threaded as at 6, so as to be suitably fitted into the coffee urn or other container 1. The valve plug 4 may extend the entire length of the housing 5, but this is not necessary, and in the preferred form as shown in Fig. 1 the plug extends just past the inlet of the passageway 7. The portion of the plug above this passageway 7 is hollow, and this portion of the plug may be designated 8 and constitutes with the inner end of the valve housing the coffee receiving chamber.

The opposite end of the valve housing 5 is preferably threaded, as at 9, to receive a suitable cap 10 enclosing a coil spring for maintaining the valve plug seated within the valve housing, and also to maintain the parts of the valve plug in alignment with the inlet and discharge passageways. The valve plug 4 may be formed of one piece, and for use in the dispensing of coffee and cream it is preferably separated by means of a suitable member 11 of suitable insulating material. The valve plug 4 is preferably split, as shown, and is provided with suitable threads 12 for receiving the threaded portions of the insulated member as shown. This insulating member serves to materially decrease the transmission of heat from the coffee, which is constantly present in the chamber 8, to the cream.

The cream from the container 2 may be supplied through the conduit 13 and may enter the valve housing, as at 14. The plug 4, as shown in Figs. 1 and 3, is provided with ports 15 and 16 in alignment with the inlet for the cream, the port 15 extending through the valve, and the port 16 extending only from the center part outwardly. A passageway 17 is positioned in alignment with the ports 15 and 16 and extends downwardly through the housing 5 merging with the passageway 7 intermediate its length.

Diametrically positioned from the passageway 17 is a vertically extending passageway 18, and this passageway terminates in a suitable inlet member 19 for receiving a threaded bottom member 20 of a measuring device 21. This measuring device 21 is preferably formed of glass and threaded at its lower end, and may be readily screwed into place into the member 20 whereby any size glass container 21 may be utilized as desired. The upper end of the container 21 is preferably provided with a tapered aperture 22, and adapted to operate in this aperture is a tapered valve member 23 having an enlarged head at one end, a semi-spherical float member 24 at the other end, the flat surface of the float member being adapted to be positioned against the upper surface of the glass container 21, as shown in Fig. 2. It will be obvious that when the float is forced upwardly, due to the entrance of liquid of the container 21, that the flat surface of the float, together with the valve member, will seal the upper end, but that when the valve is opened to discharge the liquid contained therein that the float will drop and admit air to permit the rapid emptying of the container. It will be understood that the top part of the valve 23 may be so formed as to permit the pasageway of air through the opening 22 when the valve and float are suspended.

The chamber 8 at the end of the plug 4 is provided with two ports 25 and 26, the port 25 being in alignment with the port 15, and the port 26 being approximately 135° from the port 25.

In operation, a supply of coffee and cream having been placed in the containers 1 and 2, it will be seen that with the valve handle 27 in the position shown in Figs. 2 and 3, that the cream will flow through the conduit 13, through the chamber formed of the passageways 15 and 16 and into the transparent measuring receptacle 21 until the float 24 is moved upwardly into the position shown, to stop further flow. It will also be obvious that the chamber 8 will also be filled with coffee from the urn 1. When the handle is turned vertically downwardly, as shown in Fig. 1, the ports 15 and 25 of the cream and coffee chambers, respectively, will also be positioned vertically downwardly. With the handle in this downward position the cream supply will be shut off from the valve plug and the port 15 extending through the valve plug will be in registry with the passageways 17 and 18. Thus, in this position of the handle all the cream in the transparent container 21 and in the chamber formed by the passageways 15 and 16 will be dispensed simultaneously with the proper amount of coffee necessary to fill the receptacle positioned beneath the outlet. The coffee striking and intermingling with the cream before the point of discharge will effect emulsifying and breaking up of the cream so as to effect a thorough mixing of the two liquids at the time of discharge. The return of the valve 27 to the position shown in Fig. 2 will obviously cut off the flow of coffee through the passageway 7 and permit the flow of cream from the conduit 13 into the container 21. If it is desired to dispense black coffee it will only be necessary to raise the handle 27 from the position shown in Figs. 2 and 3 to an angle 45° above horizontal whereby the port 26 may come into registry with the passageway 7. If it is desired to dispense cream alone or drain the cream from the container 21 and the supply tube, it will be obvious that it will only be necessary to move the handle 27 to its upward vertical position.

In the modification shown in Fig. 4, the valve plug is positioned vertically instead of horizontally, and when so positioned we prefer to utilize a plug 30 having a suitable housing 31, and a hollow chamber 32 at its outer end. The end of the plug 30 terminates in a threaded discharge portion 33 which is provided with a suitable nut and spring washer for holding a tapered plug 30 within the housing 31. The cream supply may be positioned, as at 34, and a passageway 35 is provided in the upper end of the plug 30 and adapted to register with the cream inlet 34. Diametrically disposed from the inlet 34 is a cream outlet conduit 36 which extends transversely and then vertically downwardly into meeting relation with a suitable conduit 37. The conduit 36 may be provided with suitable clean-out plugs at opposite ends thereof. The upper end of the conduit 37 terminates in the transparent threaded container 21 identical with the container illustrated in Figs. 1 and 2. While the opposite end of the conduit 37 terminates in the wall of the casing 31 and into horizontal registry with a suitable port 38 in the hollow lower end of the plug 30. This port 38 extends radially through the lower end of the plug 30 at right angles to the port 35, and another port 39 is positioned 90° from the port 38 and in alignment with the port 35. The purpose of the first port 38 is to dispense cream from the container 21 simultaneously with the dispensing of coffee, and the purpose of the second port 39 is to dispense cream alone from both the container 21 and the supply conduit 34. The coffee inlet may be positioned at the rear of the housing, as shown in Fig. 1 and may be designated 40, and a port 41 is positioned approximately 90° from the inlet 40 in the position of the handle, as shown in Fig. 4. A second port (not shown) is preferably positioned approximately 135° from the inlet 40 in the position of the handle, as shown in Fig. 4. The operation of this dispensing apparatus, as shown in Fig. 4 is substantially the same as shown in Figs. 1, 2 and 3, as in the position shown in Fig. 4 cream will be supplied to the container 21 and movement of the handle 90° in a clockwise direction will cause the port 41 to register with the coffee inlet port 40 and move the port 35 relative to the exit 36 to shut off the supply of cream and cause registry of the port 38 with the conduit 37 whereby all the cream in the measuring container 21 will be dispensed with the coffee.

It will thus be seen that we have provided a novel arrangement for a dispensing device for simultaneously dispensing two different liquids and accurately measuring one of the liquids and independently of the manner of storage and dispensing of the other liquid. In other words, the cream supplied will be accurate each time the dispensing handle is operated, and by accurate is meant the correct amount each time and not substantially the correct amount. The cream or syrup dispensed is visible to the customer, he sees that he is getting the correct proportionate amount and also sees the color and condition of the same. It will further be obvious that the coffee or carbonated water or other liquid will be dispensed from the source of supply without affecting in any manner the dispensing of the accurately measured cream or syrup other than to assist in its rapid discharge. The outlet conduits and ports to and from the measuring container 21 are relatively large whereby to materially assist in the rapid discharge of the cream or syrup upon the turn of the valve handle.

The measuring container 21 being of glass makes the cream or syrup visible and the customer sees that the correct amount is being measured, and being threaded at the bottom is thus easily removable for replacement or cleaning, making the device readily adaptable to any kind or amount of cream or syrup to be dispensed.

It will further be obvious that by providing a measuring or segregating device, as shown, that it is possible to use a single cream or syrup container and source of supply even when the other liquid dispensing conduit is connected to a plurality of containers, such as is often the case with coffee urns. Inasmuch as the device accurately measures and dispenses the cream or syrup independently of the pressure, flow, or viscosity of the other liquid, it will be obvious that the cream or syrup will be accurately measured and dispensed regardless of the number of or size of containers for the other liquid.

In case the operator desires to fill a receptacle of twice or three times the regular size he will know, that when the glass container has been emptied, that he should turn the valve off and allow it to fill again before completing the filling of the receptacle.

It will also be obvious that the cream chambers 15, 16 and 35, being positioned above or farther along the tapered valve plug than the coffee port, allow a small amount of cream to enter between the valve plug and its housing, thus serving as an efficient lubricant.

What we claim is:

1. Apparatus for dispensing a plurality of liquids, comprising a single valve plug, separate chambers in said valve plug for receiving and dispensing two different kinds of liquid, and insulating means forming a part of said plug for separating said two separate receiving chambers.

2. The method of simultaneously dispensing a plurality of liquids in predetermined portions, which comprises segregating an accurately measured amount of one liquid in non-heat-conducting relation with another liquid, quickly dispensing said measured quantity of liquid, accelerating its flow during dispensing and simultaneously dispensing said other liquid directly from its source of supply.

In testimony whereof we affix our signatures.

EK GILBERT BRONSON.
JOSEPH W. RUSSELL.